(12) United States Patent
Lee et al.

(10) Patent No.: US 10,859,076 B2
(45) Date of Patent: Dec. 8, 2020

(54) COMPRESSOR

(71) Applicant: LG Electronics Inc., Seoul (KR)

(72) Inventors: Kiyeon Lee, Seoul (KR); Wonsang Seo, Seoul (KR); Jongmok Lee, Seoul (KR); Jinkook Kim, Seoul (KR); Younghwan Kim, Seoul (KR); Jaebeum Kim, Seoul (KR); Kyeongho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 793 days.

(21) Appl. No.: 14/968,497

(22) Filed: Dec. 14, 2015

(65) Prior Publication Data

US 2016/0177933 A1     Jun. 23, 2016

(30) Foreign Application Priority Data

Dec. 18, 2014 (KR) .................. 10-2014-0183479

(51) Int. Cl.
| | |
|---|---|
| *F04B 35/04* | (2006.01) |
| *F04B 39/00* | (2006.01) |
| *F04B 39/12* | (2006.01) |
| *F04B 53/00* | (2006.01) |
| *F04B 39/02* | (2006.01) |

(52) U.S. Cl.
CPC .......... *F04B 35/04* (2013.01); *F04B 39/0094* (2013.01); *F04B 39/122* (2013.01); *F04B 53/006* (2013.01); *F04B 53/007* (2013.01); *F04B 39/0246* (2013.01); *F04B 39/128* (2013.01); *F16C 2360/42* (2013.01)

(58) Field of Classification Search
CPC .............. F04B 39/0094; F04B 39/0246; F04B 39/128; F04B 35/04; F04B 39/122; F04B 53/006; F04B 53/007; F16C 2360/42; F16C 19/18–188
USPC ........................ 384/504; 417/410.1, 415, 902
See application file for complete search history.

(56) References Cited

U.S. PATENT DOCUMENTS

| | | | | |
|---|---|---|---|---|
| 3,664,461 | A * | 5/1972 | Leffers .................... | F16N 7/366 184/6.16 |
| 5,205,723 | A * | 4/1993 | Kawai .................... | F04B 9/045 417/415 |
| 6,948,418 | B2 * | 9/2005 | Kim .................... | F04B 39/0094 417/415 |

(Continued)

FOREIGN PATENT DOCUMENTS

| | | |
|---|---|---|
| CN | 1548733 A | 11/2004 |
| CN | 101871443 A | 10/2010 |
| CN | 102200114 A | 9/2011 |

(Continued)

*Primary Examiner* — Alexander B Comley
(74) *Attorney, Agent, or Firm* — Birch, Stewart, Kolasch & Birch, LLP (57) ABSTRACT

A compressor according to the present disclosure may include a bearing member located out of a range in an axial direction of a rotor. Accordingly, the bearing member and the rotor cannot overlap each other so as to reduce a bearing area. This may result in reducing a frictional loss of the compressor and ensuring a press-fit length of the rotor, so as to prevent interference between the rotor and a stator. Also, an area of an oil passage can be increased without an increase in the frictional loss, resulting in an increase in an amount of oil supplied.

12 Claims, 9 Drawing Sheets

(56) References Cited

U.S. PATENT DOCUMENTS

2004/0241013 A1* 12/2004 Park ................... F04B 39/0246
                                                         417/313
2013/0156617 A1* 6/2013 Bellet ................ F04B 27/0895
                                                        417/410.1

FOREIGN PATENT DOCUMENTS

| JP | S-187358 A | 7/1993 |
| JP | 2006-161712 A | 6/2006 |
| JP | 2012-7474 A | 1/2012 |
| JP | 2012-197766 A | 10/2012 |
| KR | 10-2003-0043020 A | 6/2003 |
| KR | 10-2005-0053370 A | 6/2005 |
| KR | 10-2010-000556 A | 1/2010 |

* cited by examiner

$\alpha 2 < \alpha 1 < \alpha 3$

COMPRESSOR

CROSS-REFERENCE TO RELATED APPLICATION

Pursuant to 35 U.S.C. § 119(a), this application claims the benefit of earlier filing date and right of priority to Korean Application No. 10-2014-0183479, filed on Dec. 18, 2014, the contents of which is incorporated by reference herein in its entirety.

BACKGROUND OF THE INVENTION

1. Field of the Invention

This specification relates to a compressor, and more particularly, a compressor capable of supporting a crankshaft using an angular contact ball bearing.

2. Background of the Invention

A hermetic compressor is a compressor in which a driving motor to generate a driving force and a compression device operating by receiving the driving force from the driving motor are provided in the same casing. Such hermetic compressors may be classified into a reciprocating type, a rotary type, a vane type, a scroll type and the like according to a method of compressing a refrigerant as compressive fluid.

The reciprocating compressor is a type of compressor that sucks refrigerant, compresses refrigerant and discharges refrigerant by linearly reciprocating a piston in a cylinder. The reciprocating compressors may be classified into a vibration type and a connection type according to a driving method of the piston.

In the vibration type reciprocating compressor, the piston may reciprocate in the cylinder and vibrate while connected with a mover of a reciprocating motor, thereby compressing a refrigerant. In the connection type reciprocating compressor, a connecting rod is coupled to a crankshaft of a driving motor and a piston is coupled to the connecting rod such that a rotary motion of the driving motor is converted into a linear motion of the piston. The present disclosure relates to the connection type reciprocating compressor, and hereinafter, the connection type reciprocating compressor will be referred to as a reciprocating compressor.

Figure 1:
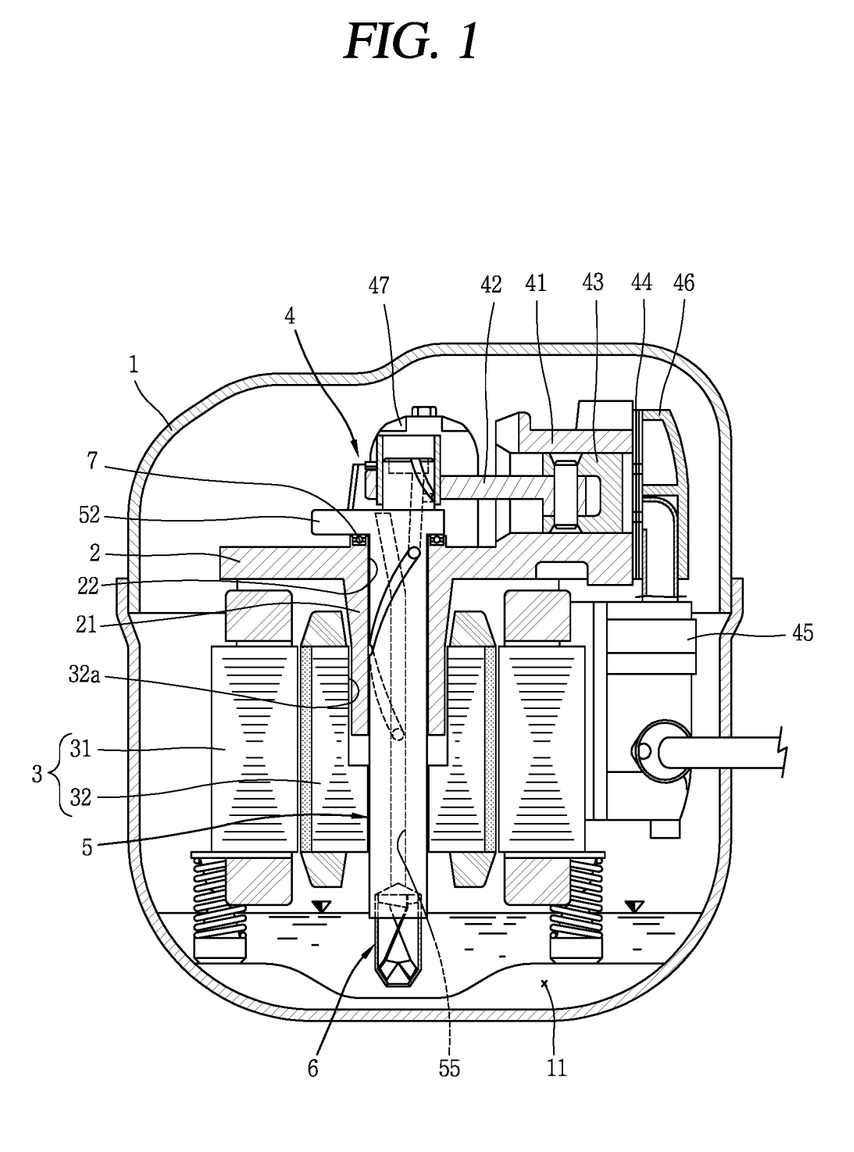
FIG. 1 is a longitudinal view of an example of the related art reciprocating compressor.

FIG. 1 is a longitudinal section view of an example of the related art reciprocating compressor.

As illustrated in FIG. 1, the related art reciprocating compressor includes a frame 2 elastically supported in a casing 1 with an oil storage unit 11, a driving motor 3 supportably disposed at one side of the frame 2 and generating a rotational force, a compression device 4 installed at another side of the frame 2 and receiving the rotational force from the driving motor 3 to compress a refrigerant, and a crankshaft 5 inserted through the frame 2 and having one end coupled to the driving motor 3 and another end coupled to the compression device 4.

The driving motor 3 includes a stator 31 elastically supported by the frame 2, and a rotor 32 rotatably installed in the stator 31.

The compression device 4 includes a cylinder 41 defining a compression chamber and integrally formed with or fixedly coupled to the frame 2, a connecting rod 42 rotatably coupled to the crankshaft 5 to convert a rotary motion of the driving motor 3 into a linear motion, a piston 43 rotatably coupled to the connecting rod 42 and compressing a refrigerant by linearly reciprocating in the cylinder 41, a valve assembly 44 coupled to an end of the cylinder 41 and provided with a suction valve and a discharge valve, a suction muffler 45 coupled to a suction side of the valve assembly 44, a discharge cover 46 coupled to accommodate therein a discharge side of the valve assembly 44, and a discharge muffler 47 communicating with the discharge cover 46 to reduce discharge noise of a discharged refrigerant.

The related art reciprocating compressor having the foregoing configuration operates as follows.

When power is applied to the stator 31 of the driving motor 3, the rotor 32 is rotated along with the crankshaft 5 by an interaction with the stator 31. The connecting rod 42 coupled to the crankshaft 5 thusly performs an orbiting motion.

Accordingly, the piston 43 coupled to the connecting rod 42 compresses a refrigerant by linearly reciprocating in the cylinder 41 and discharges the compressed refrigerant to the discharge cover 46. The refrigerant discharged to the discharge cover 46 is discharged out of the compressor via the discharge muffler 47. This series of processes are repeated.

Simultaneously, in response to the rotation of the crankshaft 5, an oil feeder 6 installed at a lower end of the crankshaft 5 pumps up oil stored in the oil storage unit 11 of the casing 1. Some of the oil is sucked up through an oil passage 55 of the crankshaft 5 to be supplied to each bearing surface, and some of the oil is scattered at an upper end of the crankshaft 5 to be supplied between the cylinder 41 and the piston 43.

Meanwhile, a bearing portion 21 extends from a central portion of the frame 2 toward the driving motor 3, and a bearing hole 22 is formed through the bearing portion 21, through which the crankshaft 5 is inserted so as to be supported in a radial direction. The bearing portion 21 downwardly protrudes by a predetermined length to have a bearing area, which is large enough to offset an eccentric load by the rotor 32 and the crankshaft 3. A bearing insertion recess 32a in which the bearing portion 21 is partially inserted by a predetermined depth is formed at an upper end portion of the rotor 32.

An eccentric mass portion 52 is formed at an upper end portion of the crankshaft 5, and a thrust ball bearing 7 supporting the crankshaft 5 in an axial direction is installed between a lower surface of the eccentric mass portion 52 and an upper surface of the frame 2.

However, in the related art reciprocating compressor, the bearing portion 21 is provided with an increase in length to offset the eccentric load by the rotor 32 and the crankshaft 5; however, such an increased length of the bearing portion 21 results in an increase in a frictional loss between the bearing portion 21 and the crankshaft 5.

Also, due to the formation of the bearing insertion recess 32a at the rotor 32, a press-fit length between the rotor 32 and the crankshaft 5 is reduced. Accordingly, at a high-speed rotation of the rotor 32, the rotor 32 tilts and thereby causing interference between the stator 31 and the rotor 32.

The oil that is scattered at the upper end of the crankshaft 5 is not smoothly supplied to a bearing surface as well as the compression device 4, which results in an increased frictional loss and lowered reliability due to the shortage of oil at the compression device 4 and the bearing surface. Specifically, at a low-speed operation, an amount of oil fed is reduced. If an inner diameter of the oil passage 55 is increased to expand the oil passage 55 by taking into account of the reduced amount of oil fed, an outer diameter of the crankshaft 5 increases by the same amount, which causes an increase in a frictional loss between the crankshaft 5 and the bearing portion 21.

SUMMARY OF THE INVENTION

Therefore, an aspect of the present disclosure is to provide a compressor that is capable of reducing a frictional loss between a bearing supporting a crankshaft in a radial direction and the crankshaft during rotation of the crankshaft.

Another aspect of the present disclosure is to provide a compressor that is capable of preventing interference between a rotor and a stator during operation by ensuring a sufficient press-fit length of a crankshaft which is press-fit into the rotor.

Another aspect of the present disclosure is to provide a compressor that is capable of smoothly supplying oil to a bearing surface as well as a compression device without an increase in a frictional loss even though a diameter of a crankshaft increases to ensure a larger area of an oil passage.

To achieve these and other advantages and in accordance with the purpose of this specification, as embodied and broadly described herein, there is provided a compressor including a frame having a shaft hole, a stator coupled to one side surface of the frame, a rotor rotatably inserted into the stator, a crankshaft rotatably coupled through the shaft hole of the frame, the crankshaft having one side coupled to the rotor and another side coupled to a compression device on the basis of the frame, and a bearing member provided between the frame and the crankshaft and supporting the crankshaft with respect to the frame, wherein under assumption that a bearing center of the bearing member is O, a first contact point of the crankshaft which is brought into contact with an inner circumferential surface of the shaft hole when the crankshaft is tilted is P1, a first virtual line connecting the first contact point and the bearing center in a perpendicular state of the crankshaft is L1, a second virtual line connecting the bearing center and one point of the inner circumferential surface of the shaft hole, with which the first contact point is brought into contact when the crankshaft is tilted, is L2, an angle between the first virtual line and the second virtual line based on the bearing center is $\alpha 1$, and a maximum tilt angle of the bearing member is $\alpha 2$, a relation of $\alpha 1 \geq \alpha 2$ may be satisfied.

Here, under assumption that a second contact point on a lower edge of the rotor, which is brought into contact with an inner circumferential surface of the stator when the crankshaft is tilted, is P2, and a third virtual line connecting the second contact point and the bearing center in the perpendicular state of the crankshaft is L3, a fourth virtual line connecting the bearing center and one point of the inner circumferential surface of the stator, with which the second contact point is brought into contact when the crankshaft is tilted, is L4, and an angle between the third virtual line and the fourth virtual line based on the bearing center is $\alpha 3$, a relation of $\alpha 2 \leq \alpha 3$ may be satisfied.

A press-fit length that the crankshaft is press-fit into the rotor may be the same as a height of the rotor in an axial direction of the rotor.

A boss portion may be formed around the shaft hole of the frame and extend toward the rotor. Here, under assumption that a third contact point of the crankshaft which is brought into contact with the inner circumferential surface of the boss portion when the crankshaft is tilted is P3, a fifth virtual line connecting the third contact point and the bearing center in the perpendicular state of the crankshaft is L5, a sixth virtual line connecting the bearing center and one point of the inner circumferential surface of the boss portion, with which the third contact point is brought into contact when the crankshaft is tilted, is L6, and an angle between the fifth virtual line and the sixth virtual line based on the bearing center is $\alpha 4$, a relation of $\alpha 4 \geq \alpha 2$ may be satisfied.

Under assumption that a second contact point on a lower edge of the rotor, which is brought into contact with an inner circumferential surface of the stator when the crankshaft is tilted is P2, and a third virtual line connecting the second contact point and the bearing center in the perpendicular state of the crankshaft is L3, a fourth virtual line connecting the bearing center and one point of the inner circumferential surface of the stator, with which the second contact point is brought into contact when the crankshaft is tilted, is L4, and an angle between the third virtual line and the fourth virtual line based on the bearing center is $\alpha 3$, a relation of $\alpha 4 \leq \alpha 3$ may be satisfied.

A boss insertion recess in which the boss portion is inserted may be formed at one side surface of the rotor. Here, under assumption that a fourth contact point of the boss portion, which is brought into contact with an inner circumferential surface of the boss insertion recess when the crankshaft is tilted is P4, a seventh virtual line connecting the fourth contact point and the bearing center in the perpendicular state of the crankshaft is L7, an eighth virtual line connecting the bearing center and one point of the inner circumferential surface of the boss portion, with which the fourth contact point is brought into contact when the crankshaft is tilted, is L8, and an angle between the seventh virtual line and the eighth virtual line based on the bearing center is $\alpha 5$, a relation of $\alpha 4 \leq \alpha 5$ may be satisfied.

To achieve the objective of the present invention, a compressor according to another exemplary embodiment may include a frame having a shaft hole, a stator coupled to one side surface of the frame, a rotor rotatably inserted into the stator, a crankshaft rotatably coupled through the shaft hole of the frame, the crankshaft having one side coupled to the rotor and another side coupled to a compression device on the basis of the frame, and a bearing member provided between the frame and the crankshaft and supporting the crankshaft with respect to the frame in a radial direction and an axial direction of the crankshaft, the bearing member being located out of a range in an axial direction of the rotor.

Here, under assumption that a bearing center of the bearing member is O, a first contact point of the crankshaft which is brought into contact with an inner circumferential surface of the shaft hole when the crankshaft is tilted is P1, a first virtual line connecting the first contact point and the bearing center in a perpendicular state of the crankshaft is L1, a second virtual line connecting the bearing center and one point of the inner circumferential surface of the shaft hole, with which the first contact point is brought into contact when the crankshaft is tilted, is L2, an angle between the first virtual line and the second virtual line based on the bearing center is $\alpha 1$, and a maximum tilt angle of the bearing member is $\alpha 2$, a relation of $\alpha 1 \geq \alpha 2$ may be satisfied.

Under assumption that a second contact point on a lower edge of the rotor, which is brought into contact with an inner circumferential surface of the stator when the crankshaft is tilted, is P2, and a third virtual line connecting the second contact point and the bearing center in the perpendicular state of the crankshaft is L3, a fourth virtual line connecting the bearing center and one point of the inner circumferential surface of the stator, with which the second contact point is brought into contact when the crankshaft is tilted, is L4, and an angle between the third virtual line and the fourth virtual line based on the bearing center is α3, a relation of α2≤α3 may be satisfied.

A boss portion may be formed around the shaft hole of the frame and extend toward the rotor. Here, under assumption that a third contact point of the crankshaft which is brought into contact with the inner circumferential surface of the boss portion when the crankshaft is tilted is P3, a fifth virtual line connecting the third contact point and the bearing center in the perpendicular state of the crankshaft is L5, a sixth virtual line connecting the bearing center and one point of the inner circumferential surface of the boss portion, with which the third contact point is brought into contact when the crankshaft is tilted, is L6, and an angle between the fifth virtual line and the sixth virtual line based on the bearing center is α4, a relation of α4≥α2 may be satisfied.

To achieve the objective of the present disclosure, a compressor according to another exemplary embodiment may include a frame having a shaft hole, a stator coupled to one side surface of the frame, a rotor rotatably inserted into the stator, a crankshaft rotatably coupled through the shaft hole of the frame, the crankshaft having one side coupled to the rotor and another side coupled to a compression device on the basis of the frame, and a bearing member provided between the frame and the crankshaft and supporting the crankshaft with respect to the frame in a radial direction and an axial direction of the crankshaft, wherein a gap between an inner circumferential surface of the shaft hole and an outer circumferential surface of the crankshaft may be greater than or equal to a bearing gap in a radial direction of the bearing member.

The gap between the inner circumferential surface of the shaft hole and the outer circumferential surface of the crankshaft may be smaller than or equal to a gap between the stator and the rotor.

A boss portion may be formed around the shaft hole of the frame and extends toward the rotor, and a gap between an inner circumferential surface of the boss portion and the outer circumferential surface of the crankshaft may be greater than or equal to the bearing gap in the radial direction of the bearing member and smaller than or equal to a gap between the stator and the rotor.

A boss insertion recess in which the boss portion is inserted may be formed at one side surface of the rotor, and a gap between an outer circumferential surface of the boss portion and an inner circumferential surface of the boss insertion recess may be greater than or equal to a gap between the inner circumferential surface of the boss portion and the outer circumferential surface of the crankshaft.

A reciprocating compressor according to the present disclosure may include a bearing member located out of a range in an axial direction of a rotor. Accordingly, the bearing member and the rotor cannot overlap each other so as to reduce a bearing area. This may result in reducing a frictional loss of the compressor and ensuring a press-fit length of the rotor, so as to prevent interference between the rotor and a stator. Also, an area of an oil passage can be increased without an increase in the frictional loss, resulting in an increase in an amount of oil supplied.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention. In the drawings.

DETAILED DESCRIPTION OF THE INVENTION

Description will now be given in detail of a compressor according to the present disclosure, with reference to one embodiment illustrated in the accompanying drawings.

Figure 2:
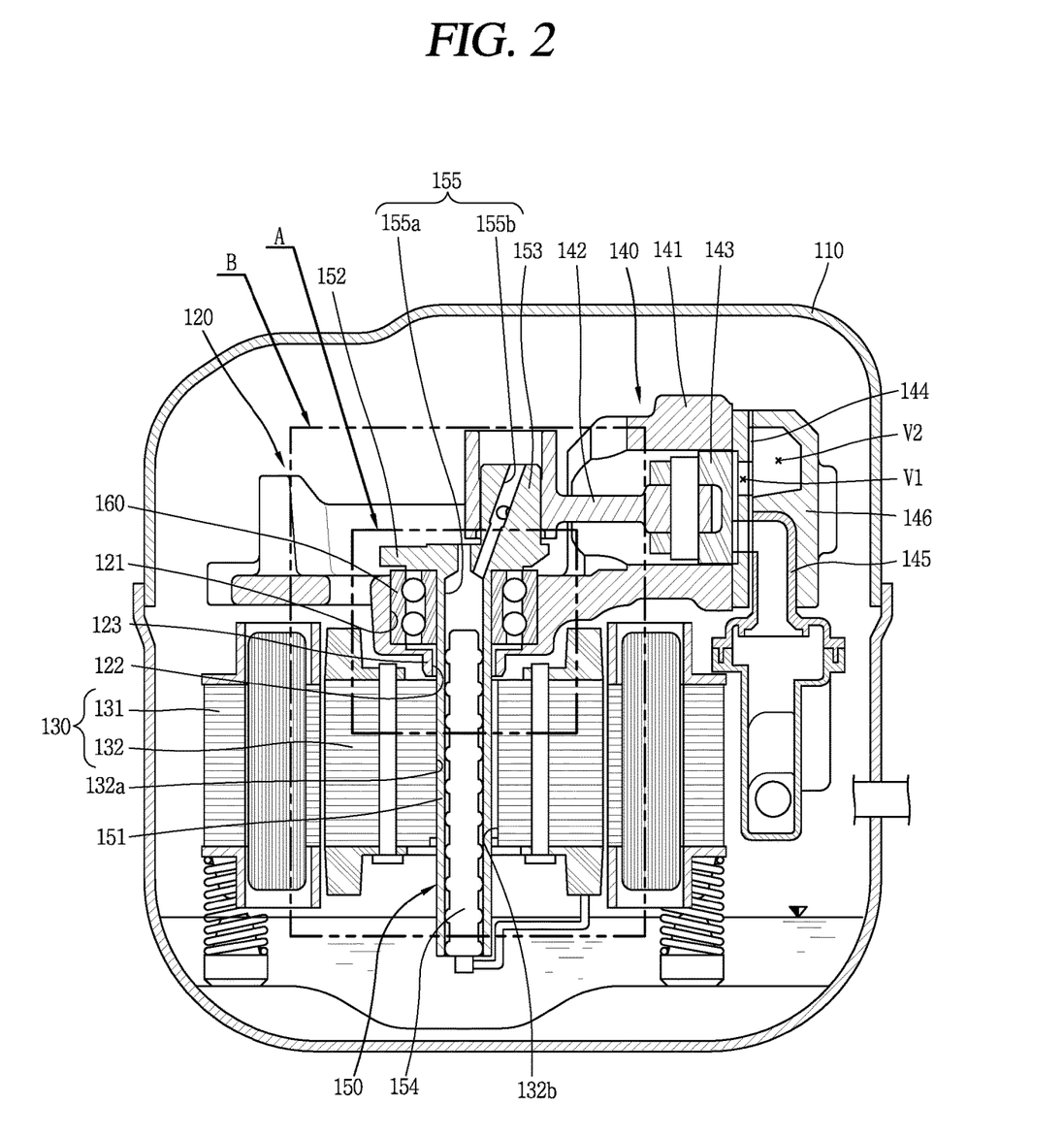
FIG. 2 is a longitudinal view of an example of a reciprocating compressor in accordance with the present disclosure.
Figure 3:
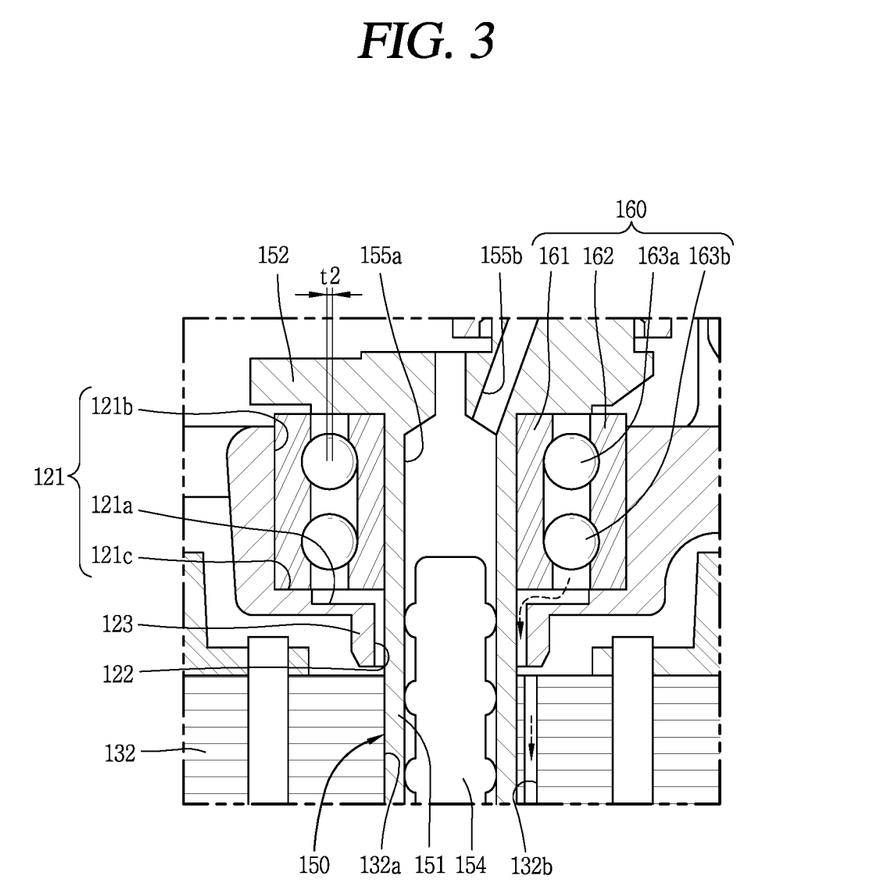
FIG. 3 is an enlarged view of a part "A" of FIG. 2.
Figure 4:
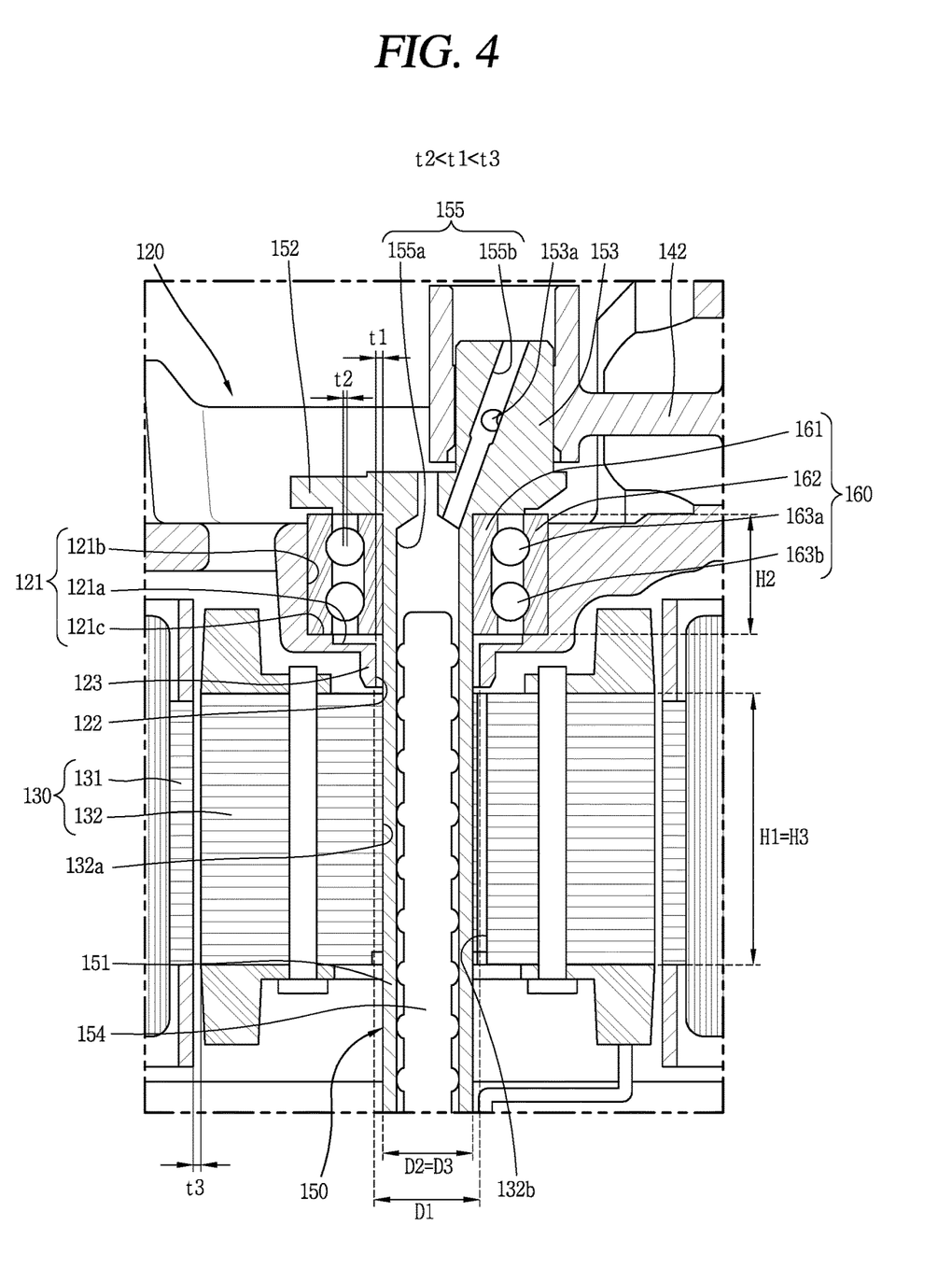
FIG. 4 is an enlarged view of a part "B" of FIG. 2.
Figure 5:
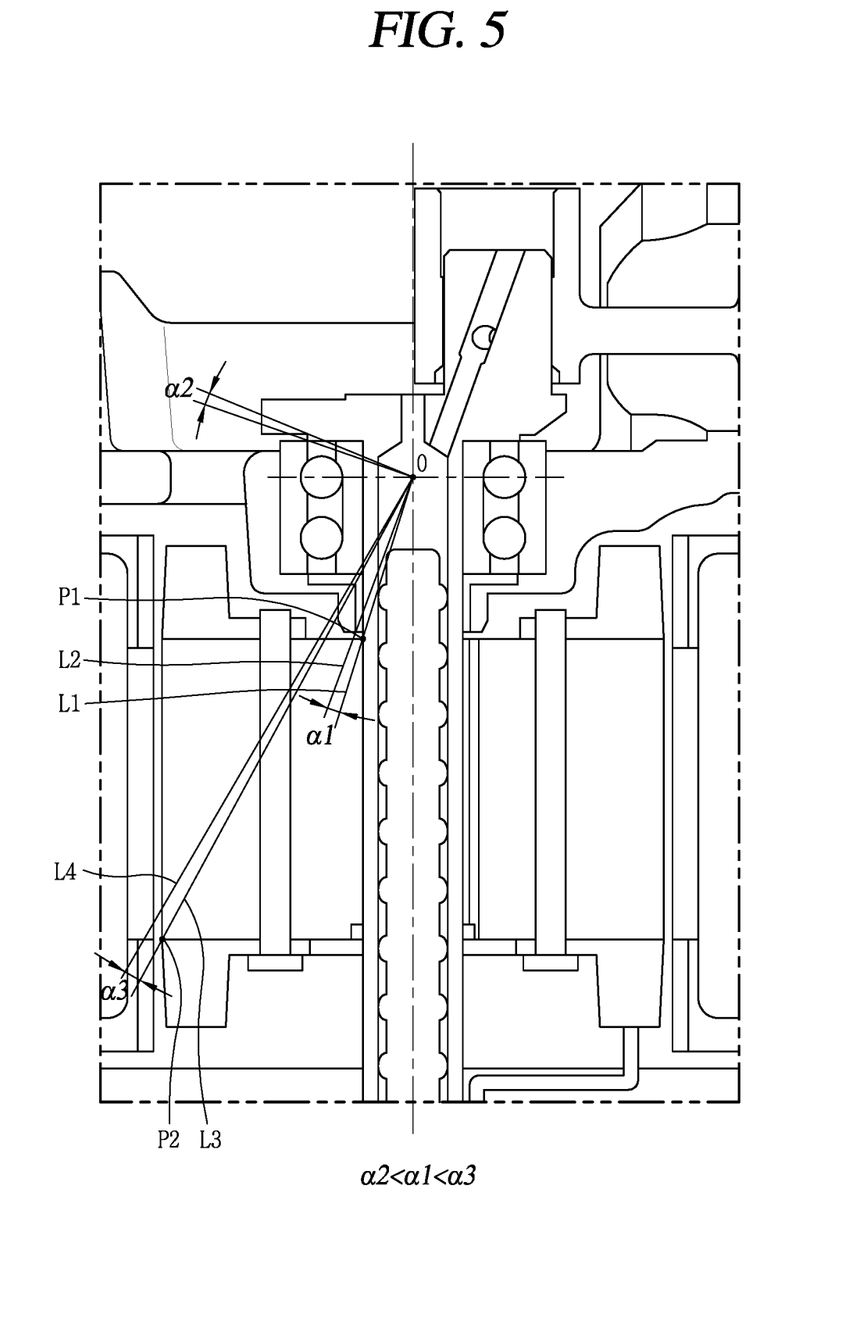
FIG. 5 is a schematic view comparing a gap between a bearing gap of a bearing member and a shaft hole in the compressor according to FIG. 2.

FIG. 2 is a longitudinal view of an example of a reciprocating compressor in accordance with the present disclosure, FIG. 3 is an enlarged view of a part "A" of FIG. 2, FIG. 4 is an enlarged view of a part "B" of FIG. 2, and FIG. 5 is a schematic view comparing a gap between a bearing gap of a bearing member and a shaft hole in the compressor according to FIG. 2.

As illustrated in FIG. 2, a reciprocating compressor according to this exemplary embodiment may include a frame 120 elastically supported in a casing 110, a driving motor 130 installed at one side of the frame 120 to generate a rotational force, and a compression device 140 disposed at another side of the frame 120 and receiving the rotational force from the driving motor 130 to compress a refrigerant. The driving motor 130 may be installed at a lower side and the compression device 140 may be installed at an upper side on the basis of the frame 120, or in some cases, vice versa. Or, the driving motor 130 and the compression device 140 may be located in left and right directions. A crankshaft 150 for transferring a rotational force of the driving motor 130 to the compression device 140 may be coupled between the driving motor 130 and the compression device 140. The crankshaft 150 may be inserted through the frame 120 so as to be supported by a bearing member 160, which is supported at the frame 120, in an axial direction and a radial direction.

A bearing mounting portion 121 to which the bearing member 160 is mounted may be formed at a central portion of the frame 120, and a shaft hole 122 through which the crankshaft 150 is inserted may be formed through a center of a bottom surface of the bearing mounting portion 121. An oil guide protrusion 123 which is in an annular shape may be formed at a lower surface of the bearing mounting portion 121 such that oil flowing down through the shaft hole 122 can be guided to an oil collection hole 132b (FIG. 3) of a rotor 132 to be explained later.

As illustrated in FIGS. 3 and 4, the bearing mounting portion 121 may be formed in a cylindrical shape with a bottom surface 121a and a side wall surface 121b. The shaft hole 122 may be formed through a center of the bottom surface 121a, and a mounting surface 121c on which an outer race 162 of the bearing member 160 to be explained later is mounted may be formed at a middle portion of the bottom surface 121a in a stepped manner. A height difference is accordingly generated between the mounting surface 121c and the bottom surface 121a, which may allow oil introduced between an inner race 161 and the outer race 162 of the bearing member 160 to be smoothly guided to the shaft hole 122.

An inner diameter D1 of the shaft hole 122 may be greater than an outer diameter D2 of the crankshaft 150 such that an inner circumferential surface of the shaft hole 122 cannot come in contact with an outer circumferential surface of the crankshaft 150.

Here, a first gap t1 between the inner circumferential surface of the shaft hole 122 and the outer circumferential surface of the crankshaft 150 may preferably be in a range that the crankshaft 150 can be tilted, namely, formed to be greater than or at least the same as a bearing gap t2, to be described below, in a radial direction of the bearing member 160, so as to prevent a contact between the shaft hole 122 and the crankshaft 150.

As illustrated in FIGS. 4 and 5, each of the first gap t1 between the inner circumferential surface of the shaft hole 122 and the outer circumferential surface of the crankshaft 150 and the bearing gap t2 in the radial direction of the bearing member 160 may be defined by a tilt angle when the crankshaft 150 is tilted based on a bearing center O of the bearing member 160 (typically, an upper ball is the basis for a double-row angular contact ball bearing).

Here, under assumption that a line connecting one point (hereinafter, first contact point) P1 of the outer circumferential surface of the crankshaft 150, which is brought into contact with the inner circumferential surface of the shaft hole 122 when the crankshaft 150 is tilted, and the bearing center O in a perpendicular state of the crankshaft 150 is a first virtual line L1, a line connecting one point of the inner circumferential surface of the shaft hole 122, with which the first contact point P1 is brought into contact when the crankshaft 150 is tilted, is a second virtual line L2, and an angle between the first virtual line L1 and the second virtual line L2 is a first tilt angle $\alpha 1$, a gap generated by the first inclination angle $\alpha 1$ is referred to as the first gap t1. A maximum tilt angle (or a second tilt angle) $\alpha 2$ that the bearing member 160 is tilted the most in the perpendicular state of the crankshaft 150 is referred to as the bearing gap (or a second gap) t2.

Also, the first gap t1 may preferably be smaller than or equal to a third gap t3 between a stator 131 and a rotor 132 to be explained later, so as to prevent interference between the stator 131 and the rotor 132. Even in this instance, under assumption that a line connecting one point (hereinafter, a second contact point) P2 of a lower edge of the rotor 132, which is brought into contact with an inner circumferential surface of the stator 131 when the crankshaft 150 is tilted, and the bearing center O in the perpendicular state of the crankshaft 150 is a third virtual line L3, a line connecting one point of the inner circumferential surface of the stator 131, with which the second contact point P2 is brought into contact when the crankshaft 150 is tilted, and the bearing center 0 is a fourth virtual line L4, and an angle between the third virtual line L3 and the fourth virtual line L4 is a third tilt angle $\alpha 3$, a gap generated by the third tilt angle $\alpha 3$ is referred to as the third gap t3.

The driving motor 130 may be provided with the stator 131 and the rotor 132. The stator 131 may be fixed to the frame 120, and the rotor 132 may rotatably be coupled to an inner side of the stator 131.

As illustrated in FIG. 4, a shaft coupling hole 132a through which the crankshaft 150 is press-fit may be formed through a center of the rotor 132. An inner diameter D3 of the shaft coupling hole 132a may be uniform in an axial direction because the rotor 132 has no need of an insertion space for the bearing member 160, which results from the bearing member 160 being located outside of a range H1 in an axial direction of the rotor 132 (more particularly, a length in an axial direction of a rotor laminate). An inner diameter D3 of the shaft coupling hole 132a of the rotor 132 may be the same as the outer diameter D2 of a shaft portion 151 of the crankshaft 150.

A plurality of oil collection holes 132b through which oil passed through the shaft hole 122 of the frame 120 is collected in the oil storage unit 111 of the casing 110 through the rotor 132 may be penetratingly formed in an axial direction around (in the vicinity of) the shaft coupling hole 132a of the rotor 132.

The compression device 140 may include a cylinder 141 having a compression space V1 and integrally formed with or separately fabricated and coupled to the frame 120, a connecting rod 142 coupled to the crankshaft 150 inserted through the frame 120 to convert a rotary motion of the driving motor 130 into a reciprocating motion, a piston 143 coupled to one end of the connecting rod 142 to compress a refrigerant by reciprocating in the compression space V1 of the cylinder 141, a valve assembly 144 coupled to an end surface of the cylinder 141 to control suction and discharge of the refrigerant, a suction muffler 145 coupled to a suction side of the valve assembly 144 to reduce noise of a sucked refrigerant, a discharge cover 146 coupled to a discharge side of the valve assembly 144 and forming a discharge space V2, and a discharge muffler (not illustrated) installed at the frame 120 to reduce noise of a discharged refrigerant.

The crankshaft 150 may include a shaft portion 151 formed long in an axial direction thereof and coupled with the rotor 132 to be explained later, an eccentric mass portion 152 extending from an upper end of the shaft portion 151 in a radial direction, and an eccentric portion 153 formed on an upper surface of the eccentric mass portion 152 and rotatably coupled to the connecting rod 142 to be explained later. An oil passage 155 along which oil is pumped up by an oil feeder 154 coupled into the crankshaft 150 may be formed in the crankshaft 150.

As illustrated in FIG. 4, the oil passage 155 may be provided with a main oil passage 155a penetratingly formed from a lower end portion of the shaft portion 151 to the eccentric mass portion 152, and a sub oil passage 155b penetratingly formed from an upper end portion of the main oil passage 155a to an upper surface of the eccentric portion 153. The main oil passage 155a may be formed along an axial direction and the sub oil passage 155b may be tilted from the axial direction.

The oil feeder 154 may be coupled to the main oil passage 155a in an inserted manner. An oil groove which is formed in a spiral shape or other shapes may be formed at an outer circumferential surface of the oil feeder 154 such that oil can be sucked up between the outer circumferential surface of the oil feeder 154 and an inner circumferential surface of the main oil passage 155a.

Here, since no bearing surface is formed on an outer circumferential surface of the shaft portion 151, an oil through hole for bypassing oil from the main oil passage 155a to the outer circumferential surface of the shaft portion 151 may not be required. However, since an outer circumferential surface of the eccentric portion 153 forms an inner circumferential surface of the connecting rod 142, or a bearing surface with a sleeve (not illustrated) coupled to the connecting rod 142, an oil through hole 153a may be formed from the sub oil passage 155b to the outer circumferential surface of the eccentric portion 153.

The bearing member 160 may be implemented as an angular contact ball bearing which is provided with a plurality of balls 163a and 163b along a circumferential direction between an inner race 161 and an outer race 162. The angular contact ball bearing may be formed in a shape that balls are arranged in a single row, but preferably be formed in a shape that balls are arranged in double rows along an axial direction, taking into account of a component in an axial direction.

The inner race 161 of the bearing member 160 may be fixed by being press-fit into an outer circumferential surface of the crankshaft 150. However, the crankshaft 150 is provided with the eccentric mass portion 152 at its upper end, and thus it may be difficult to form a stepped jaw portion for supporting the inner race 161. Therefore, the inner race 161 may be inserted into the crankshaft 150 and then welded thereon. The outer race 162 of the bearing member 160 may be press-fit into the bearing mounting portion 121 of the frame 120 to be supported in an axial direction.

Hereinafter, an operation of the reciprocating compressor according to the exemplary embodiment will be described.

When power is applied to the stator 131 of the driving motor 130, the rotor 132 is rotated along with the crankshaft 150 by interaction with the stator 131 and the connecting rod 142 coupled to the eccentric portion 153 of the crankshaft 150 performs an orbiting motion. In response to this, the piston 143 coupled to the connecting rod 142 compresses a refrigerant while linearly reciprocating in the cylinder 141 and discharges the compressed refrigerant into the discharge cover 146. The refrigerant discharged to the discharge cover 146 is discharged to the outside of the compressor via the discharge muffler (not illustrated).

Simultaneously, in response to the rotation of the crankshaft 150, the oil feeder 154 installed in a lower end portion of the crankshaft 150 pumps up oil stored in the oil storage portion 111 of the casing 110. Some of the oil is supplied to each bearing surface by being sucked up through the oil passage 155 of the crankshaft 150 and some of the oil is scattered at the upper end of the crankshaft 150 so as to be supplied between the cylinder 141 and the piston 143.

Meanwhile, when the crankshaft 150 is rotated together with the rotor 132, loads in opposite directions are generated at both sides of a rotation body on the basis of the center of gravity of the rotation body including the rotor 132 and the crankshaft 150. Due to the loads, the crankshaft 150 tends to be rotated in a tilted manner. Therefore, a bearing supporting the crankshaft 150 in a radial direction is installed between the frame 120 and the crankshaft 150 to prevent the crankshaft 150 from being tilted.

However, when the bearing is installed between the frame 120 and the crankshaft 150, a contact area is generated between the bearing and the crankshaft 150, thereby causing a frictional loss. Therefore, a bearing by which the contact area between the bearing and the crankshaft 150 is minimized and an appropriate supporting force to prevent tilting of the crankshaft 150 is ensured may be required.

Figure 6:
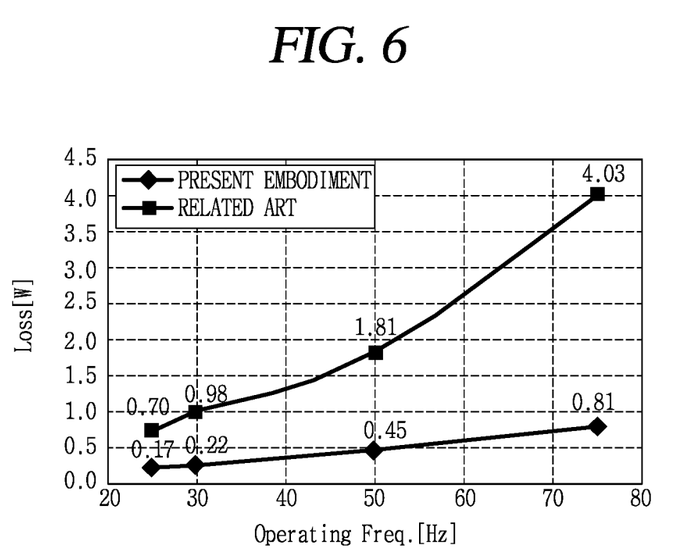
FIG. 6 is a graph illustrating a comparison result of frictional losses of the related art compressor and the compressor according to FIG. 2.

This exemplary embodiment, as illustrated in FIGS. 2 to 4, may employ a double-row angular contact ball bearing between the frame 120 and the crankshaft 150. The double-row angular contact ball bearing is a ball bearing in which a plurality of balls 163a and 163b are arranged in double rows between the inner race 161 and the outer race 162 so as to support a load (weight) in an axial direction as well as a load in a radial direction. This may allow for a point-contact of the bearing member 160 and also reducing a length H2 in an axial direction of the bearing member 160 during the rotation of the crankshaft 150, resulting in reduced contact area and frictional loss between the crankshaft 150 and the bearing member 160. FIG. 6 is a graph showing a comparison result of frictional losses of the reciprocating compressor having the bearing member according to this embodiment and a reciprocating compressor having the related art bearing. As illustrated in FIG. 6, it can be seen that the frictional loss is drastically increased at a higher operating speed of the reciprocating compressor having the related art bearing, but the frictional loss is not drastically increased even though the operating speed of the compressor is increased in the reciprocating compressor employing the bearing member according to this exemplary embodiment.

Also, the bearing mounting portion 121 of the frame 120 may be configured in a manner that a lower end thereof is higher than or at least the same as an upper surface of the rotor 132 so as not to overlap the upper surface of the rotor 132. Accordingly, because the bearing member 160 mounted on the bearing mounting portion 121 does not overlap the rotor 132, a press-fit length H3 of the rotor 132 in which the crankshaft 150 is press-fit can be ensured to be the same as or almost the same as at least a length H1 in the axial direction of the rotor 132. This may allow for stably supporting the rotor 132 and effectively prevent tilting of the rotor 132.

As noted above, when increasing an inner diameter of the oil passage 155 located in the crankshaft 150 in consideration of a low-speed operation of the compressor, an outer diameter of the crankshaft 150 should also be increased to maintain a strength of the crankshaft 150; however, such increases may result in additional frictional losses. However, as illustrated in this exemplary embodiment, when the bearing member 160 is implemented as the angular contact ball bearing, the bearing surface is not formed on a corresponding portion of the outer circumferential surface of the crankshaft 150 opposite the rotor and thus a drastic increase in the frictional loss may be avoided even though the outer diameter of the crankshaft 150 is increased. Therefore, since the frictional loss is not drastically increased even though the outer diameter of the crankshaft 150 is increased, the oil passage 155 can fully expand, taking into account the low-speed operation.

Hereinafter, another exemplary embodiment of a bearing member in the compressor according to the present disclosure will be described.

That is, the foregoing embodiment illustrates that the inner diameter D1 of the shaft hole 122 is in the range that the crankshaft 150 can be tilted, namely, greater than or at least the same as the second gap t2 of the bearing member 160 or smaller than or equal to the gap t3 between the stator 131 and the rotor 132. However, the compressor according to the foregoing embodiment can prevent the interference between the stator 131 and the rotor 132 under a normal operation condition. However, when operating under a bad condition with a great pressure load or under an abnormal operation condition in which an error (or abnormality) is caused in a refrigeration cycle, the tilting of the crankshaft 150 may be more increased than that under the normal operation condition, in view of the characteristic of the angular contact ball bearing, and accordingly an interference between the stator 131 and the rotor 132 may occur.

Figure 7:
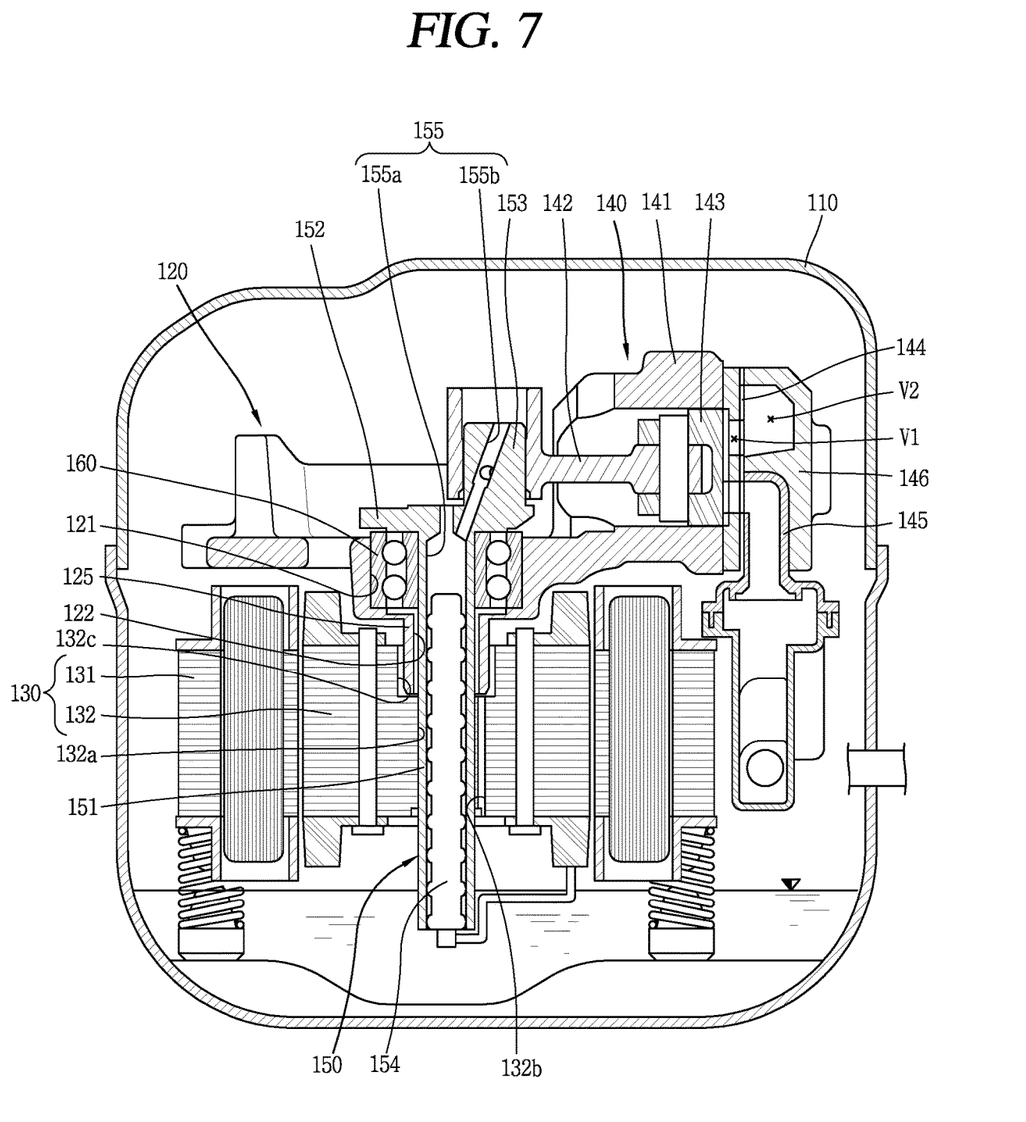
FIG. 7 is a longitudinal view illustrating another embodiment of a boss portion in a reciprocating compressor in accordance with the present disclosure.
Figure 8:
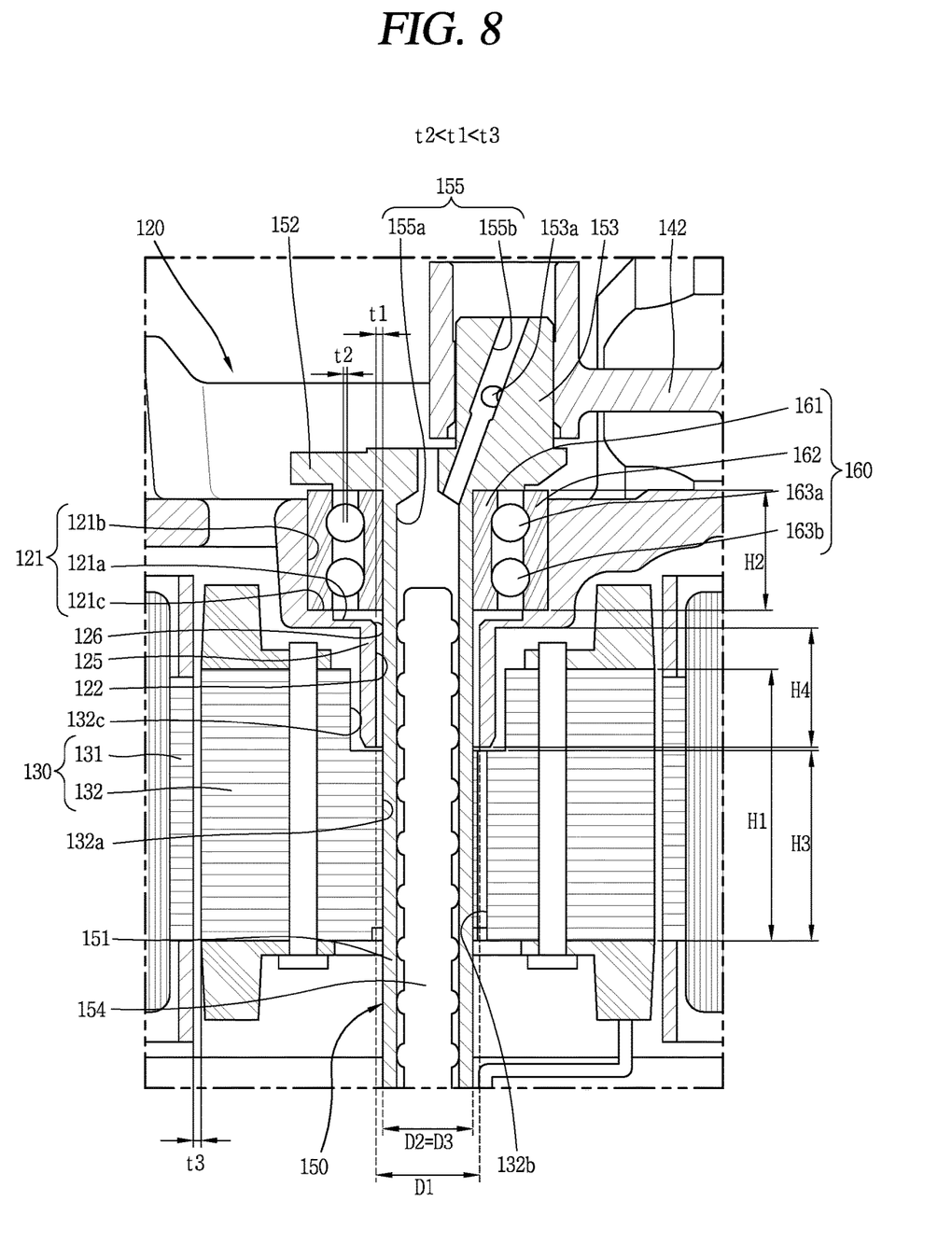
FIG. 8 is an enlarged view of surroundings of the boss portion of FIG. 7.

Considering this, this exemplary embodiment, as illustrated in FIGS. 7 and 8, may further employ a boss portion 125 that extends from a lower surface of the frame 120 toward the rotor 132 to physically restrict the tilting of the crankshaft 150 under an abnormal operation condition.

The boss portion 125 may be formed in an annular shape, but in some cases, may be formed as protrusions which are disposed with predetermined intervals along a circumferential direction. The boss portion 125 may be formed in a cylindrical shape with the same inner diameter, but also be formed in a shape that an end thereof is inwardly bent to minimize a contact area.

Figure 9:
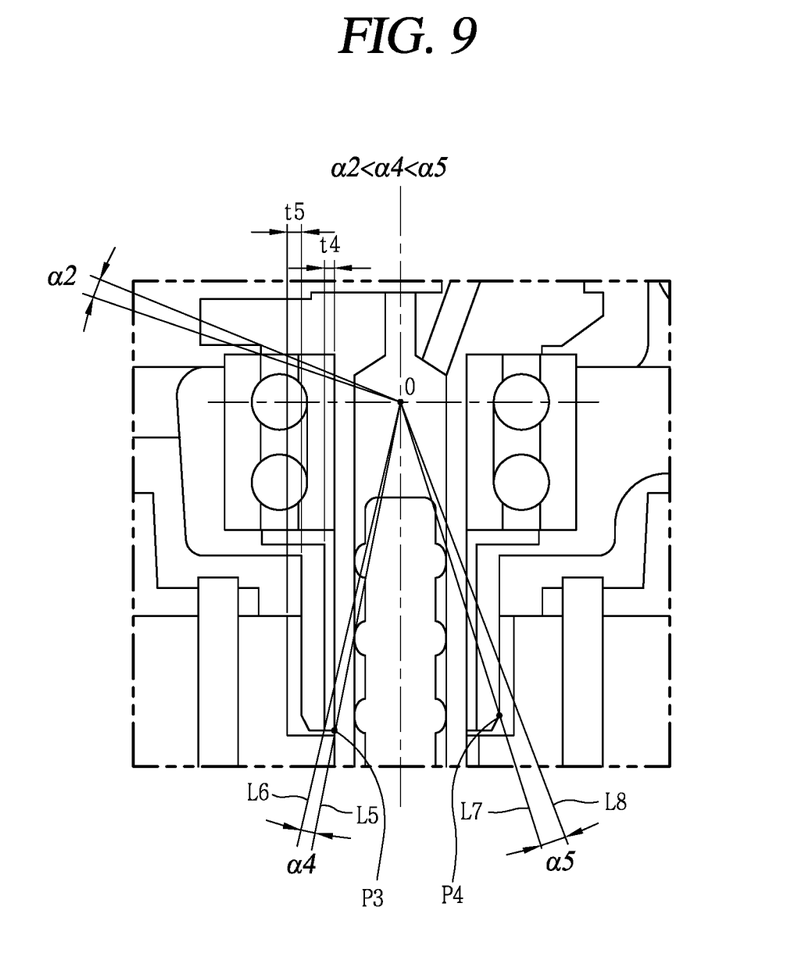
FIG. 9 is a schematic view illustrating a gap between the boss portion and a crankshaft and a gap between the boss portion and a boss insertion recess in FIG. 7.

As illustrated in FIG. 9, a gap (hereinafter, referred to as a fourth gap) t4 between an inner circumferential surface of the boss portion 125 and an outer circumferential surface of the crankshaft 150 may be greater than or equal to the second gap t2 and smaller than or equal to the third gap t3 (see FIG. 8), similar to the first gap t1 between the inner circumferential surface of the shaft hole 122 and the outer circumferential surface of the crankshaft 150. Here, under assumption that a line connecting one point (hereinafter, referred to as a third contact point) P3 of the outer circumferential surface of the crankshaft 150, which is brought into contact with the inner circumferential surface of the boss portion 125 when the crankshaft 150 is tilted, and the bearing center O in a perpendicular state of the crankshaft 150 is a fifth virtual line L5, a line connecting one point of the inner circumferential surface of the boss portion 125, with which the third contact point P3 is brought into contact when the crankshaft 150 is tilted, and the bearing center O is a sixth virtual line L6, and an angle between the fifth virtual line L5 and the sixth virtual line L6 is a fourth tilt angle α4, a gap generated by the fourth tilt angle α4 is referred to as the fourth gap t4.

With the configuration, the boss portion 125 does not come in contact with the crankshaft 150 in a normal operation state of the compressor, whereas being brought into contact with the crankshaft 150 so as to support the crankshaft 150 in a radial direction in an abnormal operation state of the compressor. Accordingly, even though the crankshaft 150 operating in the abnormal operation condition is more tilted than that in the normal operation condition, the outer circumferential surface of the crankshaft 150 may be brought into contact with the inner circumferential surface of the boss portion 125 before the stator 131 and the rotor 132 contact each other, thereby preventing interference between the stator 131 and the rotor 132. And, when the compressor operates in the normal operation condition, the boss portion 125 does not come in contact with the crankshaft 150, whereby a bearing area is not increased even though the boss portion 125 is formed and thus a frictional loss of the compressor is not increased.

An oil guide groove 126 may be formed at an edge of an upper end of the inner circumferential surface of the boss portion 125 in a chamfering manner, such that oil can smoothly flow between the inner circumferential surface of the boss portion 125 and the outer circumferential surface of the crankshaft 150.

Meanwhile, as the boss portion 125 extends in an axial direction by a predetermined length, as illustrated in FIGS. 7 and 8, a boss insertion recess 132c in which the boss portion 125 is partially inserted may be formed at an upper surface of the rotor 132 by a length corresponding to the length of the boss portion 125.

A gap t4 between an outer circumferential surface of the boss portion 125 and an inner circumferential surface of the boss insertion recess 132c, as illustrated in FIG. 9, may be greater than or equal to the second gap t2 of the bearing member 160 and smaller than or equal to the gap t3 between the stator 131 and the rotor 132. Here, under assumption that a line connecting one point (hereinafter, referred to as a fourth contact point) P4 of the outer circumferential surface of the boss portion 125, which is brought into contact with the inner circumferential surface of the boss insertion recess 132c when the crankshaft 150 is tilted, and the bearing center O in the perpendicular state of the crankshaft 150 is a seventh virtual line L7, a line connecting one point of the inner circumferential surface of the boss insertion recess 132c, with which the fourth contact point P4 of the boss portion 125 is brought into contact when the crankshaft 150 is tilted, and the bearing center O is an eighth virtual line L8, and an angle between the seventh virtual line L7 and the eighth virtual line L8 is a fifth tilt angle α5, a gap generated by the fifth tilt angle α5 is referred to as the fifth gap t5.

In this manner, when the boss insertion recess 132c is formed at the upper surface of the rotor 132, the press-fit length H3 of the rotor 132 may be reduced by a depth of the boss insertion recess 132c. However, the boss portion 125 does not serve as a bearing but serve as a type of a stopper which prevents the crankshaft 150 from being tilted. Therefore, a length H4 of the boss portion 125 may also be formed to be shorter than a length of the related art bearing and thus a reduction of the press-fit length H3 of the rotor 132 due to the boss portion 125 may not be great.

Also, the gap t5 between the outer circumferential surface of the boss portion 125 and the inner circumferential surface of the boss insertion recess 132c may preferably be greater than or equal to the gap t4 between the inner circumferential surface of the boss portion 125 and the outer circumferential surface of the crankshaft 150. Thus, even though the crankshaft 150 is rotated in a tilted state, the crankshaft 150 may first be brought into contact with the boss portion 123 so as to prevent the interference between the rotor 132 and the boss portion 125.

However, when the boss portion 125 is formed at the frame 120, an oil through hole (not illustrated) and an oil groove (not illustrated) which communicate with the main oil passage 155a may preferably be formed at the shaft portion 151 of the crankshaft 150, such that a predetermined amount of oil can be supplied between the boss portion 125 and the crankshaft 150. In this manner, some of oil sucked up into the oil passage 155 through the oil through hole 151a can be induced between the boss portion 125 and the crankshaft 150. This may result in preventing a frictional loss between the boss portion 125 and the crankshaft 150 even though the boss portion 125 and the crankshaft 150 instantaneously contact each other.

Meanwhile, the foregoing embodiments have exemplarily illustrated the reciprocating compressor, but may also be applied to any type of compressor, such as a rotary compressor and a scroll compressor, in which a rotational motor is employed and a crankshaft (or a rotational shaft) is inserted through a frame.

It should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A compressor comprising
a frame having a shaft hole;
a compression device at the frame;
a stator coupled to the frame;
a rotor rotatably coupled to the stator;
a crankshaft rotatably coupled through the shaft hole of the frame, the crankshaft having one end coupled to the rotor and another end coupled to the compression device, the crankshaft having a first contact point that is brought into contact with one point of an inner circumferential surface of the shaft hole when the crankshaft is tilted; and
a bearing member provided between the frame and the crankshaft; the bearing member supporting the crankshaft with respect to the frame,
wherein the bearing member comprises:
   an inner race fixed to an outer circumferential surface of the crankshaft;
   an outer race fixed to the frame; and
   a plurality of balls arranged in double rows between the inner race and the outer race,
wherein an eccentric mass portion extends from an upper end of the crankshaft in a radial direction,
wherein the following equation is satisfied so as to prevent a contact between the shaft hole and the crankshaft:

$$\alpha 1 > \alpha 2,$$

where $\alpha 1$ is an angle between a first virtual line extending from a bearing center of the bearing member to the first contact point of the crankshaft when the crankshaft is aligned in the shaft hole and a second virtual line extending from the bearing center to the one point of contact of the inner circumferential surface of the shaft hole, and
where $\alpha 2$ is a maximum tilt angle of the bearing member, the maximum tilt angle being greater than zero degrees,
wherein a length of the crankshaft press-fit into the rotor is the same as an overall height of the rotor in an axial direction of the rotor,
wherein the rotor includes a second contact point on a lower edge of the rotor that is brought into contact with one point on an inner circumferential surface of the stator when the crankshaft is tilted,
wherein the following equation is satisfied:

$$\alpha 2 \leq \alpha 3,$$

where $\alpha 3$ is an angle between a third virtual line connecting the second contact point on the lower edge of the rotor and the bearing center when the crankshaft is aligned in the shaft hole and a fourth virtual line connecting the bearing center and the one point of contact of the inner circumferential surface of the stator, and
wherein the following equation is satisfied:

$$\alpha 1 < \alpha 3.$$

2. The compressor of claim 1, wherein the bearing member is disposed above the rotor.

3. The compressor of claim 1, wherein the bearing member extends beyond the frame.

4. The compressor of claim 1, wherein the inner race directly contacts the eccentric mass portion.

5. The compressor of claim 1, wherein the crankshaft is coupled to a shaft coupling hole of the rotor, and a plurality of oil collection holes is penetratingly formed in an axial direction around the shaft coupling hole.

6. The compressor of claim 1, wherein a shortest distance between one end of the frame facing the rotor and the bearing member is shorter than an axial length of the bearing member.

7. A compressor comprising:
a frame having a shaft hole;
a compression device at the frame;
a stator coupled to the frame;
a rotor rotatably coupled to the stator;
a crankshaft rotatably coupled through the shaft hole of the frame, the crankshaft having one end coupled to the rotor and another end coupled to the compression device, and
a bearing member provided between the frame and the crankshaft,
wherein the bearing member comprises:
   an inner race fixed to an outer circumferential surface of the crankshaft;
   an outer race fixed to the frame; and
   a plurality of balls arranged in double rows between the inner race and the outer race, and
wherein the bearing member supports the crankshaft with respect to the frame in a radial direction and an axial direction of the crankshaft, at least a portion of the bearing member being located outside of an extent of the rotor in an axial direction of the rotor,
wherein an eccentric mass portion extends from an upper end of the crankshaft in a radial direction,
wherein the crankshaft has a first contact point that is brought into contact with one point of an inner circumferential surface of the shaft hole when the crankshaft is tilted, and
wherein the following equation is satisfied so as to prevent a contact between the shaft hole and the crankshaft:

$$\alpha 1 > \alpha 2,$$

where $\alpha 1$ is an angle between a first virtual line extending from a bearing center of the bearing member to the first contact point of the crankshaft when the crankshaft is aligned in the shaft hole and a second virtual line extending from the bearing center to the one point of contact of the inner circumferential surface of the shaft, and
where $\alpha 2$ is a maximum tilt angle of the bearing member, the maximum tilt angle being greater than zero degrees,
wherein a length of the crankshaft press-fit into the rotor is the same as an overall height of the rotor in an axial direction of the rotor, wherein the rotor includes a second contact point on a lower edge of the rotor that is brought into contact with one point on an inner circumferential surface of the stator when the crankshaft is tilted, wherein the following equation is satisfied:

$\alpha 2 \leq \alpha 3$, where $\alpha 3$ is an angle between a third virtual line connecting the second contact point on the lower edge of the rotor and the bearing center when the crankshaft is aligned in the shaft hole and a fourth virtual line connecting the bearing center and the one point of contact of the inner circumferential surface of the stator, and wherein the following equation is satisfied:

$\alpha 1 < \alpha 3$.

8. The compressor of claim 7, wherein the bearing member is located outside of the extent of the rotor.

9. The compressor of claim 7, wherein the bearing member extends beyond the frame.

10. The compressor of claim 7, wherein the inner race directly contacts the eccentric mass portion.

11. The compressor of claim 7, wherein the crankshaft is coupled to a shaft coupling hole of the rotor, and a plurality of oil collection holes is penetratingly formed in an axial direction around the shaft coupling hole.

12. The compressor of claim 7, wherein a shortest distance between one end of the frame facing the rotor and the bearing member is shorter than an axial length of the bearing member.

* * * * *